E. SAUTER.
SHEARING MACHINE.
APPLICATION FILED FEB. 9, 1910.
1,037,056.
Patented Aug. 27, 1912.
2 SHEETS—SHEET 2.
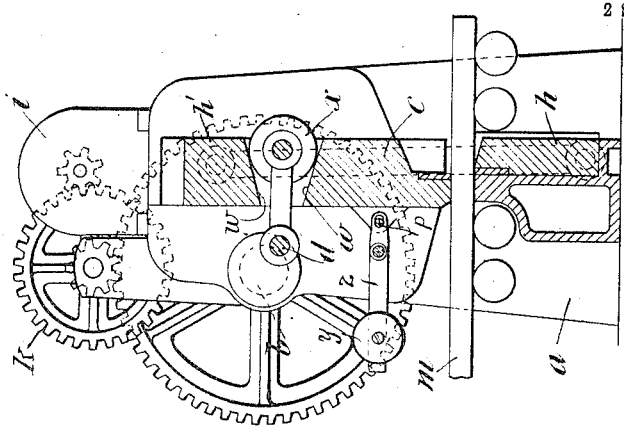
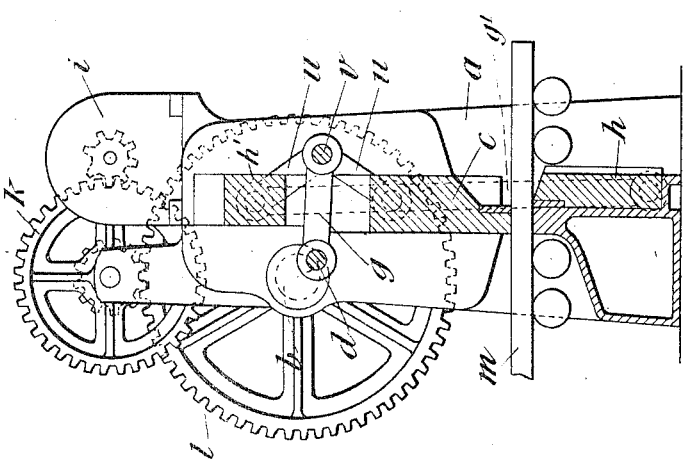
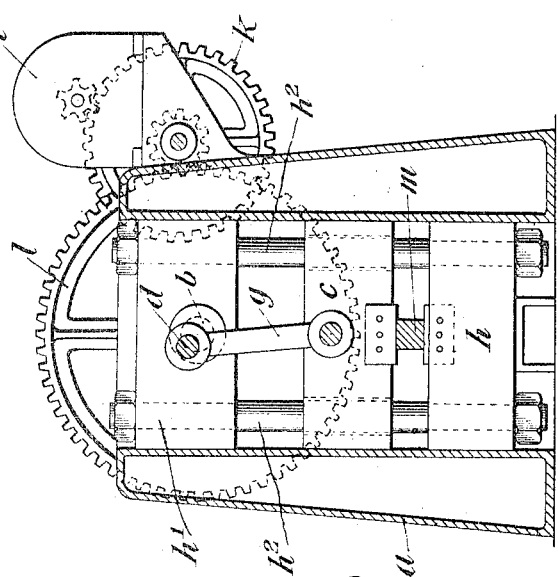
Witnesses:
John E. Krager
A Worden Gibbs
Emil Sauter Inventor
By his Attorney

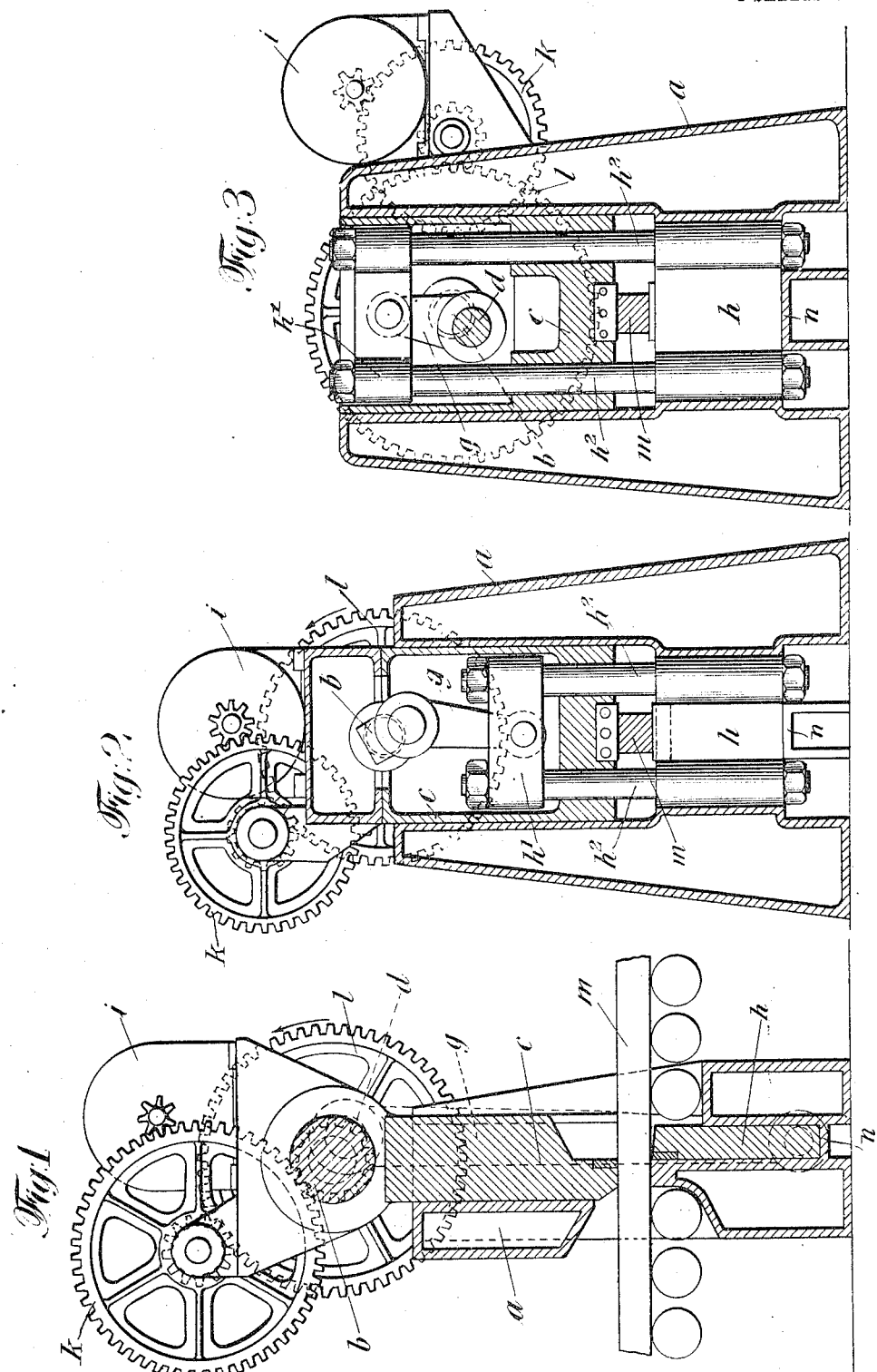

UNITED STATES PATENT OFFICE.

EMIL SAUTER, OF ESSEN-ON-THE-RUHR, GERMANY.

SHEARING-MACHINE.

1,037,056. Specification of Letters Patent. Patented Aug. 27, 1912.

Application filed February 9, 1910. Serial No. 542,904.

*To all whom it may concern:*

Be it known that I, EMIL SAUTER, engineer, a subject of the German Emperor, residing at 10 Kindlingerstrasse, Essen-on-the-Ruhr, Germany, have invented certain new and useful Improvements in Shearing-Machines, of which the following is a specification.

The invention relates to a mechanically operated shearing machine for cutting blocks, rods and the like, and in which both the upper and lower carriers are movable, being adapted to approach and recede from each other.

It has for its object to operate both of the carriers mechanically; and in such a manner that one of the two cutters is first brought into contact with the work to be cut, the other remaining stationary during this period, after which the said second cutter approaches the said first cutter and effects the cutting.

In the accompanying drawings which illustrate the invention—Figure 1 is a vertical section of the improved shearing machine. Fig. 2 is a similar view of the shearing machine but in which connecting rod for the lower cutter carrier is not directly connected thereto. Fig. 3 is a vertical section of the shearing machine and in which the driving means is carried by the frame of the machine and not by upper carrier as in the machines shown in the foregoing figures. Fig. 4 is a vertical section of a machine of the type illustrated in Fig. 3, and shows, furthermore, the crank shaft mounted in the transverse member which is suitably connected to the lower carrier, the connecting rod being connected to the upper carrier. Figs. 5 and 6 are vertical sections illustrating further modifications in the method of mechanically moving said cutter carriers toward and away from each other.

Similar characters of reference designate corresponding parts throughout the several views.

Referring now to Fig. 1 of the drawings, $a$ designates a suitable frame, $b$ a crank shaft adapted to be rotated by a suitable motor $i$ through gearing $k$, $l$. The crank shaft $b$, as well as its driving mechanism, are mounted in a support such as a movable carrier $c$ constituting the carrier for the upper cutter of the shearing machine. It will, however, be understood that the crank shaft and driving mechanism could also be mounted in the carrier $h$ of the lower cutter. This lower carrier $h$ is operated from a crank $d$, by means of the connecting rod $g$. Both carriers move in suitable guides provided in the frame $a$. The downward movement of the carrier $h$ in the support is limited, for example by means of a suitable stop $n$. On the rotation of the crank shaft in the direction of the arrow, the upper carrier $c$ descends until it meets a resistance. It will thus come into contact with the block $m$ and remain in this position, whereupon on the further rotation of the crank shaft, the lower carrier $h$ is raised and the block is cut. After the cutting operation, the lower carrier again descends until it comes into contact with the stop $n$. As its downward movement is then prevented, the upper carrier $c$ is moved back into its original position.

Fig. 2 shows a shearing machine in which the crank shaft $b$, the driving motor $i$ and the intermediate gearing $k$ $l$ are likewise mounted in the upper carrier $c$. The connecting rod $g$ is not directly connected to the lower carrier, however, but to a transverse member $h^1$, provided in the upper carrier $c$, which is connected to the lower carrier by connecting rods $h^2$. The downward movement of the latter in the frame $a$ is limited by the stop $n$.

The machine illustrated in Fig. 3 is essentially the same as that illustrated in Fig. 2, the difference being that the driving motor $i$ and gearing are mounted on the frame $a$.

In the constructional form illustrated in Fig. 4 the crank shaft $b$ is mounted in the transverse member $h^1$ which is connected to the lower carrier $h$ by connecting rods $h^2$, and the crank rod $g$ is connected to the upper carrier $c$. The crank shaft $b$ is driven by the motor $i$ mounted on the frame $a$ through the gearing $k$ $l$.

Fig. 5 shows a construction in which a toggle is connected to the upper carrier $c$ and to a sliding member $h^1$ connected to the lower carrier $h$ by connecting rods $g^1$, the toggle pin $v$ being operated from the crank shaft $b$ by a connecting rod $g$. According to the direction of movement of the pin $v$, whether inward or outward, the cutters are moved toward or from each other. In this manner, therefore, during the outward movement of the pin, the upper cutter descends before the lower cutter rises, whereas on the inward movement of the pin $v$ the lower cutter first descends and then the upper cutter rises.

According to Fig. 6, oppositely disposed inclined planes $w$ are provided on the upper carrier and on the slide $h^1$, which latter is connected to the lower carrier $h$. Between these planes are adapted to slide rollers $x$ operated from the crank shaft $b$ through connecting rod $g$. When the rollers $x$ are drawn into the space between the inclined planes, the cutters are moved toward each other, whereas when the rollers $x$ are moved in an opposite direction, the cutters are separated. Or, the lower cutter falls automatically while the upper cutter is raised by any suitable device, such as the counterweight $y$ on the outer end of a lever $z$ carried by the frame $a$, and whose inner end $p$ is connected with the said upper cutter carrier.

I claim:

1. In a shearing machine for cutting blocks, rods and the like: two carriers adapted to approach and recede from each other, and suitable cutters carried thereby; means connecting said carriers to each other; and actuating means connected with said carriers to first move one of said carriers to bring its cutter into contact with the work to be cut, the other carrier remaining stationary until the cutter of said first carrier comes into contact with the work, whereupon said second carrier approaches said first carrier and causes its cutter to effect the cutting.

2. In a shearing machine for cutting blocks, rods and the like: two carriers adapted to approach and recede from each other, and suitable cutters carried thereby; and actuating means, carried by one of said carriers and connected with both of said carriers, to first move one of said carriers to bring its cutter into contact with the work to be cut, the other carrier remaining stationary until the cutter of said first carrier comes into contact with the work, whereupon said second carrier approaches said first carrier and causes its cutter to effect the cutting.

3. In a shearing machine for cutting blocks, rods and the like: two carriers adapted to approach and recede from each other, and suitable cutters carried thereby; means connecting said carriers to each other; a stop to limit the movement of one of said carriers; and actuating means connected with said carriers to first move the free carrier to bring its cutter into contact with the work to be cut, the other carrier remaining stationary against the said stop until the cutter of said first carrier comes into contact with the work, whereupon said second carrier approaches said first carrier and causes its cutter to effect the cutting.

4. In a shearing machine for cutting blocks, rods and the like, two carriers adapted to approach and recede from each other, and suitable cutters carried thereby; a crank shaft, and means to rotate the same; and intermediate mechanism connecting both of said carriers with said crank shaft to first move one of said carriers to bring its cutter into contact with the work to be cut, the other carrier remaining stationary until the cutter of said first carrier comes into contact with the work, whereupon said second carrier approaches said first carrier and causes its cutter to effect the cutting.

5. In a shearing machine for cutting blocks, rods and the like: two carriers adapted to approach and recede from each other, and suitable cutters carried thereby; a crank shaft, and means to rotate the same, said crank shaft and said rotating means being carried by one of said carriers; a stop to limit the movement of the other of said carriers; and intermediate mechanism connecting both of said carriers with said crank shaft to first move the crank shaft carrier to bring its cutter into contact with the work to be cut, the other carrier remaining stationary against the said stop until the cutter of said first carrier comes in contact with the work, whereupon said second carrier approaches the first carrier and causes its cutter to effect the cutting.

6. In a shearing machine for cutting blocks, rods and the like: two carriers adapted to approach and recede from each other, and suitable cutters carried thereby; a crank shaft, and means to rotate the same, said crank shaft and said rotating means being carried by one of said carriers; a transverse member relatively movable with respect to said crank shaft carrier, and suitable rods connecting said other carrier with said transverse member; a crank mounted on said shaft, and a connecting rod connecting said crank with said transverse member and thereby with said other carrier; and a stop to limit the movement of said carrier, whereby when the said crank shaft is rotated, said crank shaft carrier is first moved to bring its cutter into contact with the work to be cut, the other carrier remaining stationary against said stop until the cutter of said crank shaft carrier comes in contact with the work, whereupon said other carrier approaches said crank shaft carrier and causes its cutter to effect the cutting.

In testimony whereof I have hereunto signed my name to this specification in the presence of two subscribing witnesses.

EMIL SAUTER.

Witnesses:
LOUIS VANDORY,
ROBERT H. DUNLAP.